United States Patent [19]

Arora et al.

[11] 4,309,320

[45] Jan. 5, 1982

[54] PIGMENT FLUSHING

[75] Inventors: Manohar L. Arora, Zeeland; Thomas E. Foye, Jenison, both of Mich.

[73] Assignee: BASF Wyandotte Corporation, Wyandotte, Mich.

[21] Appl. No.: 109,414

[22] Filed: Jan. 3, 1979

[51] Int. Cl.³ .................. C09C 3/10; C09D 17/00
[52] U.S. Cl. .................. 260/23 R; 106/235;
106/241; 106/262; 106/285; 106/308 F;
106/308 S; 106/309; 260/27 R; 260/33.6 UA;
260/34.2
[58] Field of Search .......... 106/262, 285, 235, 309;
260/34.2, 23 R, 23.3, 27 R, 33.6 UA

[56] References Cited

U.S. PATENT DOCUMENTS

| | | | |
|---|---|---|---|
| 2,378,786 | 6/1945 | Osborne | 106/309 |
| 2,637,711 | 6/1950 | Auer | 260/29.2 UA |
| 2,907,670 | 10/1959 | Katz et al. | 106/262 |
| 2,929,733 | 5/1960 | Kebrich et al. | 106/262 |
| 3,980,448 | 9/1976 | Barrington et al. | 106/262 |
| 4,227,936 | 10/1980 | Osswald et al. | 106/262 |

OTHER PUBLICATIONS

McCormack, *American Ink Maker*, May, 1961, pp. 79, 80 & 118.

*Primary Examiner*—Allan Lieberman
*Attorney, Agent, or Firm*—Bernhard R. Swick

[57] ABSTRACT

In the method for transferring an organic pigment from an aqueous pulp to a water-immiscible hydrophobic organic vehicle the improvement to achieve low initial viscosity, good shelf stability, and good tint strength comprising incorporating an additive selected from the class of sulfonated sperm oil, sulfated sperm oil and mixtures thereof with said vehicle and said pigment.

15 Claims, No Drawings

PIGMENT FLUSHING

BACKGROUND OF THE INVENTION

1. Field of the Invention

This invention relates to new and useful improvements in non-aqueous pigment dispersions. It relates particularly to the transfer of a pigment from an aqueous pulp or presscake directly into organic vehicles by an operation known to those skilled in the art as flushing. It relates more particularly to agents for the flushing of an organic pigment to provide a low viscosity, shelf-stable dispersion having good tint strength.

2. Description of the Prior Art

The flushing of pigment presscakes, in order to disperse the pigment in an organic vehicle, is well known. The transfer may be effected in some cases by merely kneading the press cake and vehicle together until substantially all the water has separated. In most prior art methods, a surface-active agent is added to facilitate the transfer. There have been many attempts in the prior art to find different surface-active agents or surfactants, generally referred to as flushing aids, in order to solve specific problems such as the large amount of mechanical work required, a lack of tinting strength of the flushed color, and the like. Many attempts have been made to find a flushing aid for an organic pigment which would provide a flushed color having a low viscosity both initially and during long term storage. The search has been complicated by the further requirement that the flushing aid should have little or no detrimental effect on the tint strength of the flushed color.

Sulfonates prepared from various organic materials have been tried as flushing aids. Reference is made in U.S. Pat. No. 2,120,588 to the use of a condensation product of naphthalene sulfonic acid with formaldehyde. Petroleum sulfonates have long been used as dispersing agents in the flushing of pigment presscakes. In some instances, however the flushed color obtained has a high initial viscosity and a poor shelf stability, i.e., the viscosity increases to an unacceptably high value upon storage at ambient temperatures.

The use of cationic surface-active materials such as long-chain aliphatic quaternary ammonium, long-chain sulfonium, and long-chain phosphonium compounds as flushing aids, is taught in U.S. Pat. No. 2,192,954. In this patent, however, it is taught that such cationic material sometimes cause the formation of a water-in-oil emulsion which prevents the separation of the bulk of the water. In order to overcome that problem, U.S. Pat. No. 2,219,395 teaches the addition of a sulfonated fatty oil, a sulfonated aromatic compound or a fatty alcohol sulfate to the kneaded mass of pigment, water, oil and cationic material in order to reverse the objectionable water-in-oil emulsion.

U.S. Pat. No. 3,256,202 discloses improved surface-active agents including salts of sulfated hydrocarbon alcohols derived from sperm oil and suggests that they may be valuable as dispersants for dyes, pigments, etc. However, there is no disclosure of the use of sulfated or sulfonated sperm oils in a flushing process. Further, this patent is directed to mixtures of sulfated aliphatic hydrocarbon alcohols. These mixtures consist essentially of at least one salt of a sulfated lower aliphatic alcohol having from 1 to 4 carbon atoms and at least one salt of a sulfated higher aliphatic alcohol having at least 16 carbon atoms. Sulfated sperm oil is listed as one of the higher aliphatic alcohols. Mixture of the latter with the former is treated as essential to the invention.

U.S. Pat. No. 3,449,261 discloses a mixture of sulfonated hydrocarbons such as spermiceti oil and tris(butoxyethyl)phosphate in dyeing operations. However, the disclosure is for use in dyeing textiles as a low-foaming wetting agent for the textile and not as a flushing aid.

Accordingly, it is a purpose of the instant invention to provide for flushing an organic pigment whereby a flushed color having a low initial viscosity, good shelf stability, and good tint strength will be available to the printing ink and coating industries.

SUMMARY OF THE INVENTION

This invention relates to the method for transferring organic pigment from an aqueous pulp of the pigment to a water-immiscible organic vehicle by mixing said aqueous pulp and said vehicle until a major portion of the water present in said pulp separates. In accordance with the instant invention, at least one additive selected from the class consisting of sulfonated sperm oil, sulfated sperm oil, and mixtures thereof, is incorporated with said pigment and said vehicle.

DESCRIPTION OF THE PREFERRED EMBODIMENTS

It has been discovered in accordance with the instant invention that an organic pigment may be dispersed in a hydrophobic organic vehicle through the use of sulfonated sperm oil or sulfated sperm oil or mixture thereof. The use of cationic surface-active materials as per the disclosures of U.S. Pat. Nos. 2,192,854 and 2,219,395 is not necessary nor is the inclusion of a salt of a sulfated lower aliphatic alcohol.

The method of this invention is particularly useful with alkali blue pigments ranging from the green shades to the red shades. The structure, manufacture, uses and properties of alkali blue pigments are described by G. R. Buckwalter at pages 617 to 624 of the *Handbook of Pigments*, published by John Wiley and Sons, 1972 edition. Said description is incorporated herein by reference. As described in the *Handbook of Pigments*, an alkali blue pigment is in itself a water-insoluble sulfonic acid or internal salt. The commercially pure pigment is prepared by the addition of an acid to a solution of the sodium salt. While the method and additive of this invention are particularly suited for flushing an alkali blue pigment, the invention is also applicable to other organic pigments such as azo red, particularly Nos. 48, 52, and 57, diarylide AAA yellow, particularly No. 12, and phthalocyanine blue, particularly No. 15.

The aqueous pulp of the pigment is the presscake formed upon filtration of an aqueous slurry of the precipitated pigment. The press cake still contains a large amount of water, i.e., about 60 to 90 percent by weight. The proportion of press cake to vehicle will have a very wide range depending upon the concentration of pigment in the vehicle that is ultimately desired and which may range from a very small percentage of presscake to a very high percentage of presscake.

Any of the hydrophobic organic vehicles that are commonly used in printing ink and coating compositions may be employed in the method and composition of this invention. Such vehicles are represented by drying, semi-drying and non-drying oils, litho varnishes, mineral oils, rosins, dimerized rosins esters of dimerized rosins, aliphatic and aromatic hydrocarbon resins, alkyl aromatic resins, maleic and fumeric-modified rosin, phenolic resin, phenolic-modified rosin esters, alkyd resins, urethane-modified alkyds, polyolefins, polyindenes, cumarone/indene resins, phthalate esters, castor oil, fish oil, linseed oil, gloss varnishes, and the various heat-set, quick-set and steam-set vehicle systems.

The term "sulfonated sperm oil" as used herein means either the sulfonic acid produced by the sulfonation of sperm oil or the alkali metal or ammonium salt of the acid. The sulfated sperm oil is an essentially neutral sulfate ester produced by the action of sulfuric acid on sperm oil. Sperm oil, as is known to those skilled in the art is a natural product obtained from the sperm whale; the general composition of which is as follows:

| 5.0% | Myristic acid | $C_{14}$ |
|---|---|---|
| 4.0% | Myristoleic acid | $C_{14}$ |
| 6.5% | Palmitic acid | $C_{16}$ |
| 26.5% | Palmitoleic acid | $C_{16}$ |
| 37.5% | Oleic acid | $C_{17}$ |
| 19.0% | Eicasapolyenoic acid | $C_{20}$ |
| 1.5% | Other acids | $C_{12}-C_{24}$ |

The recent move to save whales has forced manufacturers to develop "synthetic oil". Such synthetic oils have compositions substantially the same as the above and are presently available on the market. A synthetic sulfated sperm oil called AESS (aliphatic ester sulfate substitute) works equally well with the instant invention. Acordingly, the terms "sulfonated sperm oil" and "sulfated sperm oil" as used herein include products obtained from both the natural sperm oil from the sperm whale and the synthetic sperm oil.

The additive or surfactant may be added to the aqueous slurry of the precipitated pigment before filtration thereof, to the press cake directly, to the organic vehicle before admixture with the presscake, to a mixture of the vehicle and press cake, or to the mixture of vehicle and pigment after the water is removed.

Generally the amount of additive employed is from about 5 percent to about 40 percent of the dry weight of the pigment contained in the pulp or presscake. Preferably, the amount is from about 10 percent to 25 percent of the pigment's dry weight.

As previously pointed out, a mixture of the sulfonated sperm oil and the sulfated sperm oil may be used. The two surfactants may be mixed in any proportion but an especially useful mixture contains about 60 parts of sulfonate to 40 parts of sulfate by weight.

Conventional flushing equipment such as high shear homogenizers, a Kady mill, sigma-blade mixers and the like may be used to mix the pulp, vehicle and additive. The mixing is usually carried out at ambient temperature, for example, about 70 to 85° F. Higher temperatures up to about 200° F. may be employed.

As the mixing proceeds, the pigment surfaces become receptive to the organic vehicle and water separates from the aqueous pulp. This water is removed from the mixture by decantation, centrifugation or other mechanical means. The time required for the separation of the water, i.e., by weight about 60 to 95 percent, preferably 75 to 95 percent, of the water depends upon a number of factors, including the viscosity of the pulp which in turn is related to the amount of pigment in said pulp, the temperature, the type and amount of organic vehicle and the amount of flushing aid. Generally, it will require about 15 to 150 minutes to separate the water.

The following examples are illustrative of the method and composition of this invention. All parts are by weight and all temperatures are in degrees Fahrenheit unless otherwise indicated.

EXAMPLE 1

A presscake containing 500 parts (24 percent by weight of the presscake) of a red shade alkali blue pigment is divided into 6 equal portions. Two portions of the presscake are mixed in a sigma blade mixer at room temperature (about 70°) with 75 parts of the sodium salt of sperm oil sulfonic acid sold under the trademark Eureka 400 by Atlas Refinery, Inc. 125 parts of a 20:80 polyindene/fish oil vehicle (Vehicle A), and 97 parts of a 30:70 polyindene/lithographic varnish vehicle (Vehicle B). Frictional heat causes the temperature to rise to about 75° after 30 minutes and 362 parts of water are decanted from the mixture. Another portion of the presscake is added to the mixture along with 25 parts of the Eureka 400 additive and 34 parts of Vehicle B. After 25 minutes, the temperature is 90° and 378 parts of water are decanted. This is the maximum temperature. The remaining three portions of presscake are charged separately along with sufficient amounts of Vehicle B to bring the total of said vehicle to 270 parts. About 85 percent of the water which was present in the presscake is removed by the decanting process.

The mixture is then let down with 120 parts of a triple O lithographic varnish [OOO Litho] and the dispersion is mixed under reduced pressure to remove the residual water. A hydrocarbon solvent (191 parts) sold under the trademark Magie 520 by the Magie Brothers Company and 9 parts of a 25 percent solution of antioxidant in Magie 47 solvent are added and drying of the flushed color is completed under reduced pressure to give 1280 parts of product.

EXAMPLE 2

A presscake containing 500 parts (24 percent by weight of the presscake) of a red shade alkali blue pigment is divided into 2 equal portions. One portion of the presscake is mixed in a sigma blade mixer at room temperature (about 70°) with 75 parts of sulfated sperm oil sold by Refined Onyx company as Aliphatic Ester Sulphate, 125 parts of a 20:80 polyindene/fish oil vehicle (Vehicle A), and 182 parts of a 30:70 polyindene/lithographic varnish vehicle (Vehicle B). Frictional heat causes the temperature to rise to about 86° after 30 minutes and 712 parts of water are decanted from the mixture. The second portion of the presscake is divided into three equal parts one of which is added to the mixture along with 25 parts of the sulfonated sperm oil and 51 parts of Vehicle B. After 25 minutes, the temperature is 95° and 253 parts of water are decanted. The temperature eventually reached a maximum of 116°. The remaining two portions of presscake are charged separately along with sufficient amounts of Vehicle B to bring the total of said vehicle to 270 parts. About 90 percent of the water which was present in the presscake is removed by the decanting process.

The mixture is then let down with 120 parts of a triple O lithographic varnish [OOO Litho] and the dispersion is mixed under reduced pressure to remove the residual water. A hydrocarbon solvent (191 parts) sold under the trademark Magie 520 by the Magie Brothers Company and 9 parts of a 25 percent solution of antioxidant in Magie 47 solvent are added and drying of the flushed color is completed under reduced pressure to give 1234 parts of product.

EXAMPLE 3

A presscake containing 500 parts (24 percent by weight of the presscake) of a red shade alkali blue pigment is divided into 2 equal portions. One portion of the presscake is mixed in a sigma blade mixer at room temperature (about 70°) with 77 parts of a 60:40 mixture of the sodium salt of sperm oil sulfonic acid sold under the trademark Eureka 400 and sulfated sperm oil described in Example 3, 125 parts of a 20:80 polyindene/fish oil vehicle (Vehicle A), and 166 parts of a 30:70 polyindene/lithographic varnish vehicle (Vehicle B). Frictional heat causes the temperature to rise to about 89° after 17 minutes and 600 parts of water are decanted from the mixture. The second portion of the presscake is divided into three parts, one of which is added to the mixture along with 59 parts of Vehicle B. After 12 minutes, the temperature is 90° and 294 grams of water are decanted from the mixture. A second one-sixth part of the presscake is added to the mixture along with 23 parts of the 60:40 mixture and 29 parts of Vehicle B. After 26 minutes, the temperature is 100° (the maximum) and 270 parts of water are decanted. The remaining one-sixth portion of presscake is charged along with 16 parts of Vehicle B. About 87 percent of the water which was present in the presscake is removed by the decanting process.

The mixture is then let down with 120 parts of a triple O lithographic varnish [O Litho] and the dispersion is mixed under reduced pressure to remove the residual water. A hydrocarbon solvent (191 parts) sold under the trademark Magie 520 by the Magie Brothers Company and 9 parts of a 25 percent solution of antioxidant in Magie 47 solvent are added and drying of the flushed color is completed under reduced pressure to give 1265 parts of product.

EXAMPLE 4

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of synthetic sulphated sperm oil which is essentially the same as the sulphated sperm oil of Example 3 except that synthetic sperm oil is employed in lieu of natural sperm oil in manufacturing the product, 138 parts of a 20:80 polyindene/fish oil vehicle (Vehicle A), and 54 parts of a 30:70 polyindene/lithographic varnish vehicle (Vehicle B). After 23 minutes 237 parts of water were decanted from the mixture. The remaining portions of presscake are charged separately along with sufficient amounts of Vehicle B to bring the total of said vehicle to 294 parts. About 80 percent of the water which was present in the presscake was removed by the decanting process.

The mixture is then let down with 132 parts of a triple O lithographic varnish [OOO Litho] and the dispersion is mixed under reduced pressure to remove the residual water. A hydrocarbon solvent (209 parts) sold under the trademark Magie 520 by the Magie Brothers Company and 10 parts of a 25 percent solution of antioxidant in Magie 47 solvent are added and drying of the flushed color is completed under reduced pressure to give 1413 parts of product.

EXAMPLE 5

Comparative Example

A presscake containing 500 parts (24 percent by weight of the presscake) of a red shade alkali blue pigment is divided into two equal portions. One portion of the presscake is mixed in a sigma blade mixer at room temperature (about 70° C.) with 75 parts of a sulfonated naphthylenic petroleum hydrocarbon sold by Emery Industries under the name Twitchell Base 8911. 125 parts of a 20:80 polyindene/fish oil vehicle (Vehicle A) and 179 parts of a 30:70 polyindene/lighographic varnish vehicle (Vehicle B). Frictional heat causes the temperature to rise to about 90° after 25 minutes, and 256 grams of water are decanted from the mixture. The remaining half of the presscake is divided into three equal parts, one of which is added to the mixture along with 87 parts of Vehicle B. After 20 minutes, the temperature is 100° C. and 531 parts of water are decanted. Another one-sixth portion of the presscake is added to the mixture along with 25 parts of the sulfonated petroleum hydrocarbon. After five minutes, the temperature is still 100° and 195 grams of water is decanted. The remaining portion of the presscake is added to the mixture along with 4 parts of Vehicle B. After 90 minutes, 231 grams of water are decanted off and the temperature is about 110°. About 77 percent of the water which was present in the presscake is removed by the decanting process.

The mixture is then let down with 120 parts of a triple O lithographic varnish [OOO Litho] and the dispersion is mixed under reduced pressure to remove the residual water. A hydrocarbon solvent (191 parts) sold under the trademark Magie 520 by the Magie Bros. Company and 5 parts of a 25 percent solution of antioxidant in Magie 47 solvent are added and drying of the flush color is completed under reduced pressure to give 1291 parts of product.

Table 1 shows the initial viscosity, the viscosity after storage for three months at 120°, the tint strength and the bronze-tone of the products of Examples 1-5. The viscosity of products was determined with a Laray viscometer and the values are reported in poises. The tint strengths are relative values and, therefore a tint strength of 100 is assigned arbitrarily to the control product. The bronze tone are also relative values wherein the lower the number, the better the bronze tone.

TABLE I

| Product | Initial Viscosity | 3-Month Viscosity | Tint Strength | Bronze Tone |
| --- | --- | --- | --- | --- |
| Example 1 | 53 | 77 | 104 | 6 |
| Example 2 | 151 | 162 | 100 | 5 |
| Example 3 | 150 | 176 | 98 | 4 |
| Example 4 | 70 | 90 | 102 | 6 |
| Example 5 (control) | 231 | 293 | 100 | 5 |

EXAMPLE 6

A presscake containing 632 parts (24 percent by weight of the presscake) of pigment red 57 is divided into 6 equal portions. Two portions of the presscake are mixed in a sigma blade mixer at room temperature (about 70°) with 65 parts of alkyd resin vehicle (Vehicle A), and 222 parts of a 30:70 hydrocarbon solvent/rosin modified ester vehicle (Vehicle B). The hydrocarbon solvent is sold under the trademark Magie 47 by the Magie Bros. Co. The mixture is heated whereby the temperature rises to about 150° C. after 20 minutes and 535 parts of water are decanted from the mixture. Another portion of the presscake is added to the mixture along with 30 parts of a 40:60 Magie 47 solvent/alkyl aromatic hydrocarbon resin vehicle (Vehicle C). After 15 minutes, the temperature is 145° and 256 parts of water are decanted. The remaining three portions of presscake are charged separately along with sufficient amounts of Vehicle C to bring the total parts of said vehicle to 256 and the water is decanted. Ninety eight parts of a 40:60 Magie 47/rosin vehicle, and 86 parts of Vehicle C are added and the water decanted. About 72 percent of the water which was present in the presscake is removed by the decanting process. The temperature reaches a maximum of 165°. The mixture is tested for shade at 180°, 190°, 200° and 210° and the shades were respectively very yellow, medium yellow, very slightly yellow and very, very slightly yellow. The mixture is quenched with 57 parts Vehicle C.

The mixture is then let down with 281 parts of Vehicle C and 48 parts of higher boiling alcohol. A hydrocarbon solvent (108 parts) sold under the trademark Magie 47 by the Magie Brothers Company and 6 parts of a 25 percent solution of antioxidant in Magie 47 solvent are added and drying of the flushed color is completed under reduced pressure to give 1810 parts of product. The viscosity of this product was 15,202 poise as determined by a Laray viscometer.

EXAMPLE 7

A presscake containing 632 parts (24 percent by weight of the presscake) of pigment red 57 is divided into 6 equal portions. Two portions of the presscake are mixed in a sigma blade mixer at room temperature (about 70°) with 65 parts of an alkyd resin vehicle (Vehicle A), and 222 parts of a 30:70 hydrocarbon solvent-/rosin modified ester vehicle (Vehicle B). The hydrocarbon solvent is sold under the trademark Magie 47 by the Magie Bros. Co. The mixture is heated whereby the temperature rises to about 140° after 20 minutes and 558 parts of water are decanted from the mixture. Another portion of the presscake is added to the mixture along with 39 parts of a 40:60 Magie 47 solvent/alkyl aromatic hydrocarbon resin vehicle (Vehicle C). After 20 minutes, the temperature is 145° and 266 parts of water are decanted. The remaining three portions of presscake are charged separately along with sufficient amounts of Vehicle C to bring the total parts of said vehicle to 256 and the water is decanted. Ninety-eight parts of a 40:60 Magie 47/rosin vehicle, and 196 parts of Vehicle C are added and the water decanted. About 75.5 percent of the water which was present in the presscake is removed by the decating process. The temperature reaches a maximum of 175°. The mixture is tested for shade at 180°, 190°, 200°, 205°, 215°, and 220°, and the shades were respectively very yellow, medium yellow, very slightly yellow, very slightly yellow, very very slightly yellow, very very slightly yellow, and very very slightly yellow. The mixture is quenched with 38 parts Vehicle C and 126 parts of AESS synthetic sulfated sperm oil is added.

The mixture is then let down with 96 parts of Vehicle C and 48 parts of higher boiling alcohol. A hydrocarbon solvent (76 parts) sold under the trademark Magie 47 by the Magie Brothers Company and 6 parts of a 25 percent solution of antioxidant in Magie 47 solvent are added and drying of the flushed color is completed under reduced pressure to give 1816 parts of product. The viscosity of this product was 5742 poise as determined by a Laray viscometer and the tint strength was 2 percent greater than the product of Example 6.

It will be apparent to one of ordinary skill in the art that many changes and modifications can be made to the invention described herein without departing from the spirit and scope thereof.

The embodiments of the invention in which an exclusive privilege or property is claimed are defined as follows:

1. In the method for transferring an organic pigment from an aqueous pulp of the pigment to a water-immiscible hydrophobic organic vehicle by mixing said aqueous pulp and said vehicle until a major portion of the water present in said pulp separates, the improvement to achieve low initial viscosity, good shelf stability, and good tint strength comprising incorporating, in an amount effective to achieve said results, at least one additive selected from the class consisting of sulfonated sperm oil, sulfated sperm oil, and mixtures thereof with said vehicle and said pigment.

2. The method of claim 1 wherein said additive is mixed with the aqueous pulp before said pulp is mixed with the vehicle.

3. The method of claim 1 wherein said additive is mixed with the organic vehicle before said vehicle is mixed with the pulp.

4. The method of claim 1 wherein said additive, said aqueous pulp, and said vehicle are all mixed together.

5. The method of claim 1 wherein said additive is mixed with said pigment and vehicle after removal of said water.

6. The method of claim 1 wherein said pigment is an alkali blue pigment.

7. The method of claim 1 wherein said pigment is Pigment Red 57.

8. The method of claim 1 wherein said aqueous pulp contains by weight about 60 to 90 percent water and said additive is added in an amount of about 5 to 40 percent by weight of the dry pigment in the presscake.

9. The method of claim 8 wherein said mixing is performed at a temperature of about 70 to 200° F. for a period sufficiently long to remove from 60 to 95 percent by weight of the water in the presscake.

10. The process of claim 9 wherein said mixing is performed for about 15 to 150 minutes.

11. A composition characterized by low initial viscosity, good shelf stability, and good tint strength consisting essentially of an organic pigment, a water-immiscible hydrophobic organic vehicle, and at least one additive selected from the class consisting of sulfonated sperm oil, sulfated sperm oil, and mixtures thereof in an amount effective to achieve said low initial viscosity, good shelf stability, and good tear strength.

12. The composition of claim 11 wherein said organic pigment is an alkali blue pigment.

13. The composition of claim 11 wherein said additive is sulfated sperm oil.

14. The composition of claim 11 wherein said additive is sulfonated sperm oil.

15. The composition of claim 11 wherein said additive is a mixture of sulfonated sperm oil and sulfated sperm oil.

* * * * *